United States Patent Office 3,642,943
Patented Feb. 15, 1972

3,642,943
ACRYLIC URETHANE COMPOSITION OF ACRYLIC POLYMER WITH PENDANT ISOCYANATE GROUPS AND ISOCYANATE CONTAINING URETHANE PREPOLYMER
Charles M. Noel, Erie, Pa., assignor to Lord Corporation, Erie, Pa.
No Drawing. Filed July 8, 1970, Ser. No. 53,336
Int. Cl. C08g 41/04
U.S. Cl. 260—859 R
49 Claims

ABSTRACT OF THE DISCLOSURE

There is provided a mixture of (A) a polyurethane prepolymer and (B) a copolymer of an acrylic monomer and an adduct of an organo diisocyanate and a hydroxyalkyl acrylic monomer. The composition has enhanced adhesive properties as compared to the polyurethane prepolymer alone, particularly to vinyl substrates, and hence is especially adapted for use as a coating on vinyl substrates exhibiting marked adhesion thereto and blocking migration of plasticizer from the vinyl substrate into the coating.

BACKGROUND OF THE INVENTION

It has been considered desirable to coat vinyl substrates, especially plasticized vinyl material, with a clear material having high gloss and good abrasion-and solvent resistance. Reactive polyurethanes (which cure on application by virtue of moisture in the atmosphere, or by addition of a polyol or other active hydrogen-containing material or by heating) have such properties which would make them particularly attractive for this purpose. However, polyurethanes generally exhibit very poor adhesion to vinyl substrates, especially highly plasticized ones where the slight initial adhesion obtained decreases markedly with time and plasticizer migration. Moreover, plasticizer migration, if not prevented, results in inferior surface appearances such as blooming, blushing and oiliness on the coating surface and embrittlement of the vinyl material. Such surface exudation can result eventually in fogging within closed areas such as automobile interiors. Reactive polyurethanes often require, for complete cure, temperatures over 300° F. where plasticizer migration is accelerated. This, in conjunction with a cooling cycle after curing, has resulted in heavy deposits of plasticizer on the surface of the polyurethane coating.

It has been found, however, that the addition of a relatively small amount of an isocyanate acrylic copolymer, prepared by copolymerizing an acrylic monomer with an adduct of an organo diisocyanate and a hydroxyalkyl acrylic monomer, to a urethane prepolymer provides a coating composition possessing the advantageous characteristics of the polyurethanes (excellent appearance and abrasion resistance and good solvent resistance) while having marked adhesion to vinyl substrates, including vinyls highly plasticized as with dioctyl phthalate, tricresylphosphate, adipates, and the like, and prevents migrating of such plasticizers into and through the coating. The isocyanate acrylic copolymer by itself has excellent adhesion to vinyl substrates but poor solvent and abrasion resistance. However, acrylics and polyurethanes are normally not compatible so that the results are surprising and, moreover, since the combination when applied to vinyl substrates exhibits excellent adhesion and excellent adhesion retention after thermal aging (to force plasticizer migration) along with good flex properties, abrasion resistance, solvent resistance and appearance, it appears that the effects are synergistic. The composition has also been found to exhibit good adhesion to chlorinated polyethylene. to aged moisture-cured polyurethane and to cellulose acetate propionate to which cured polyurethane prepolymer alone adheres little or not at all. The composition also has been found to posses markedly increased resistance to heat as compared to the cured polyurethane alone.

U.S. Pat. 2,958,704 discloses the preparation of an adduct of an organo diisocyanate and an hydroxyalkyl acrylic compound, and suggests copolymerization of the adduct with other vinyl monomers, including acrylic acid and methacrylic acid esters. U.S. Pat. 3,297,745 discloses related reactions in which, however, two mols of the hydroxyalkyl acrylic compound are reacted with one mol of the diisocyanate.

It is the principal object of the present invention to provide a composition containing a polyurethane prepolymer which has improved adhesion properties and which is specially adapted to serve as a coating on vinyl substrates, including highly plasticized vinyl substrates and other substrates.

Another object of the invention is to provide a composition for coating vinyl substrates which possesses marked adhesion thereto and also possesses advantageous characteristics of polyurethanes.

A further object of the present invention is to provide a coating composition for vinyl substrates which while possessing the advantageous characteristics of polyurethane coatings, does not permit migration of plasticizer from the underlying vinyl substrate through the coating.

Still another object of the invention is to provide an improved method for coating vinyl substrates.

These and other objects will become apparent from a consideration of the following specification and claims.

SUMMARY OF THE INVENTION

The novel composition of the present invention is a solution of polymeric material which consists essentially of a mixture of (A) a urethane prepolymer and (B) a copolymer of an acrylic monomer and an adduct of an organo diisocyanate and a hydroxy alkyl acrylic compound which copolymer has the formula:

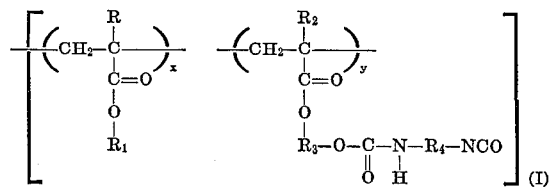

where R is hydrogen or methyl; where $R_1$ is an alkyl group containing from 1 to 10 carbon atoms; where $R_2$ is hydrogen or methyl; where $R_3$ is an alkylene chain containing from 2 to 4 carbon atoms, the total number of carbon atoms in $R_2$ plus $R_3$ being at least 3; where $R_4$ is a divalent organo radical; where $x$ is from about 0.70 to 0.99; where $y$ is from 0.01 to about 0.30 ($x+y$ equalling 1); and where the relative proportions of A and B are from about 30 to 99% of A from about 1 to about 70% of B, by weight, based on the combined weight of both.

The composition will normally be made, marketed and used in the form of a solution. Once removed from the container and applied to a substrate, the solvent evaporates and the polymers, through the isocyanate groups attached to the urethane prepolymer and to the isocyanate acrylic copolymer, crosslink by reaction with moisture in the atmosphere or by reaction with added active hydrogen-containing material or by the application of heat or by various combinations of these.

URETHANE PREPOLYMER

One component of the present composition is the urethane prepolymer. These are well known and are available in many forms depending upon the principal reactants (polyisocyanate and polyol) used in their preparation. Basically they are adducts or condensation products of an organo polyisocyanate and a polyol in a ratio to provide over 1 to about 3 or 4 isocyanate groups per hydroxyl group of the polyol so that the product will contain free, unreacted isocyanate (—NCO) groups.

The polyol used in preparing the urethane prepolymer will generally have an average molecular weight of from about 300 to about 3000. Since the polyol component may be made up of a mixture of different polyols having different molecular weights, a minor proportion of the polyol component may have a molecular weight below 300 and a minor proportion may have a molecular weight above 3000. Suitable polyols include polyalkylene glycols such as polyethylene glycols, polypropylene glycols and polyethylenepropylene glycols; polyetherpolyols such as those prepared by the addition polymerzation of ethylene oxide and/or propylene oxide and a polyol like trimethylol propane in a ratio to provide unreacted hydroxyl groups in the product; polyesterpolyols such as those prepared by copolymerizing a low molecular weight polyol like epsilon caprolactone, mono-, di- or triethylene or propylene glycol, trimethylolpropane, trimethylolethane or 1,4-butanediol, with a polycarboxylic acid like phthalic, terephthalic, adipic, maleic or succinic acid, in a ratio to provide unreacted hydroxyl groups in the product; glyceride esters of hydroxylated fatty acids, like castor oil, hydrogenated castor oil, glycerol monoricinoleate, glycerol diricinoleate, blown drying oils (e.g. blown linseed oil or blown soya oil); and the like. A small amount of a low molecular weight polyhydric compound like 1,3-butanediol, may be included.

The organo polyisocyanates used in preparing the urethane prepolymer generally are cyclic in nature and contain two isocyanate groups. Examples of such polyisocyanates are 2,4 tolylene diisocyanate, 2,6-tolylene diisocyanate, m- and p-phenylene diisocyanate, phosgenated aromatic diamines, 1,5-naphthalene diisocyanate, 3,3'-bitolylene-4,4'-diisocyanate, diphenylmethane-4,4'-diisocyanate, isophorone diisocyanate, methyl cyclohexyl diisocyanate, and 4,4'-methylenebis (cyclohexyl isocyanate). Mixtures of polyisocyanates may be used.

The urethane prepolymer may be prepared by heating a mixture of the polyol and organo polyisocyanate to a temperature from above room temperature up to about 130° C. The reaction generally takes place in a dry nonreactive organic solvent, preferably an aromatic hydrocarbon like benzene or toluene—a dry inert atmosphere, like dry nitrogen, is also provided.

ISOCYANATO ACRYLIC COPOLYMER

The second component of the present composition is an isocyanato acrylic copolymer which is a copolymer of (1) an adduct of an organo diisocyanate and a hydroxy alkyl acrylic monomer and (2) an acrylic monomer.

The adduct is prepared by reacting a hydroxyalkyl acrylic monomer with a molecular equivalent of organo diisocyanate (two isocyanate groups per hydroxyl group in the hydroxyalkyl acrylic monomer) in accordance with the equation:

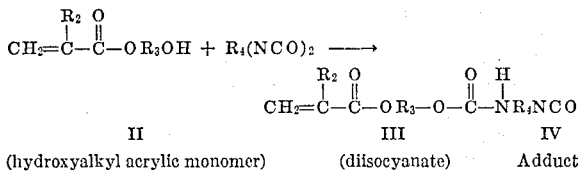

(hydroxyalkyl acrylic monomer)  (diisocyanate)  Adduct

In the foregoing Formulae II and IV, $R_2$ may be hydrogen (acrylate) or methyl (methacrylate) and $R_3$ is an alkylene chain containing from 2 to 4 carbon atoms, the total carbon atoms in $R_2$ plus $R_3$ being at least 3. Examples of suitable hydroxyalkyl acrylic monomers are hydroxypropyl acrylate, hydroxybutyl acrylate, hydroxyethyl methacrylate, hydroxypropyl methacrylate and hydroxybutyl methacrylate. Hydroxyethyl methacrylate is the preferred hydroxyalkyl acrylic monomer ($R_2$ is methyl and $R_3$ is ethylene). In Formula III, $R_4$ is simply a divalent organo radical, generally cyclic, as illustrated above in connection with the preparation of the urethane prepolymer. A particularly preferred diisocyanate is 4,4'-methylenebis (cyclohexyl isocyanate), in which case $R_4$ is methylenebis (cyclohexylene), especially one having sufficient cis-cis isomer content to be liquid at room temperature.

The adduct may be prepared by heating a mixture of the hydroxyalkyl acrylic monomer and diisocyanate to from about 60 to about 80° C. until reaction is complete as noted, for example, by —NCO content. Preferably a slight excess (up to about 10%) of diisocyanate is used so that the ratio of NCO/OH is slightly over 2:1. The reaction is carried out in solution in dry, nonreactive (to the isocyanate) solvent which may be an ester, like ethyl acetate or ethylene glycol monoethyl ether acetate; a ketone like methyl ethyl ketone or methyl isobutyl ketone or an aromatic hydrocarbon like toluene, or a mixture thereof. The solids content in the solution is advantageously from about 20 to about 80%, preferably from about 45 to about 55%, by weight. To inhibit homopolymerization, a small amount (about 0.1% by weight based on the weight of the solids) of a free radical polymerization inhibitor, like m-dinitrobenzene, is included in the reaction mixture. To insure freedom of the reaction mixture from moisture a small amount (about 0.5% by weight based on the weight of the solids) of a water scavenger, like trimethyl orthoformate, may be initially added to one or more of the reactants, and the reaction may be carried out under a dry inert gas, like nitrogen. A condensation catalyst like p-toluene sulfonic acid (when trimethyl orthoformate is used as moisture scavenger) or stannous octoate, is preferably used. About 0.05–0.1%, by weight, based on the weight of the solids is satisfactory. Advantageously the diisocyanate is first added to the solvent, the mixture heated and the hydroxylalkyl acrylic monomer then added slowly. The condensation catalyst is normally added last.

The isocyanato acrylic copolymer is prepared by condensing an acylic monomer with the adduct in accordance with the equation:

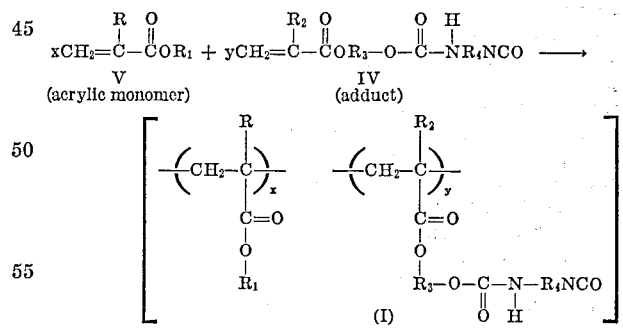

In Formulae I and V above, R is hydrogen or methyl and $R_1$ is an alkyl group containing from 1 to 10 carbon atoms. Examples of such compounds corresponding to Formula V are methyl acrylate, ethyl acrylate, n-butyl acrylate, 2-ethyl hexyl acrylate, methyl methacrylate, ethyl methacrylate, n-butyl methacrylate, hexyl methacrylate, 2-ethyl hexyl methacrylate and isodecyl methacrylate. Mixtures of such acrylic monomers may be used. The preferred acrylic monomer is n-butyl acrylate (R is hydrogen and $R_1$ is n-butyl).

In the copolymer, the portion derived from the acrylic monomer (V) will predominate making up from about 70 to 99 mol percent, and preferably from about 80 to about 95 mol percent. Hence, x in the foregoing equation and Formula I will be from about 0.70 to 0.99, preferably from about 0.80 to about 0.95, the y being the balance from 0.01 to about 0.30, preferably from about 0.05 to about 0.20). A particularly valuable copolymer is one in which $x$ is about 0.85 and $y$ is about 0.15.

It will be noted from Formula I that the isocyanato acrylic copolymer contains unreacted isocyanate groups. It is curable as is the urethane prepolymer with which it is mixed according to the present invention.

Reference is made herein to the copolymer consisting essentially of comonomeric units IV and V. This is not intended to exclude minor amounts of other materials or reactants which do not materially alter or detract from the advantageous characteristics of the defined copolymer or final mixture containing the same. Thus, minor amounts of other copolymerizable materials may be used to modify certain properties. For example, a small amount of ethylthioethylmethacrylate has been found to improve the resistance of the copolymer to thermal discoloration; the addition of a small amount of acrylonitrile has been found to increase the toughness and hardness of the copolymer while, on the other hand, a small amount of stearyl methacrylate has a marked plasticizing effect to enhance flexibility and softness.

The copolymer may be prepared by heating a mixture of acrylic monomer and adduct to a temperature of from about 75 to about 130° C. A free radical polymerization catalyst, such as azobisisobutyronitrile, is employed in an amount ranging from about 0.1 to about 2%, preferably from about 0.25 to about 1%, by weight, based on the weight of the solids. The reaction takes place in solution in a solvent which may be one of those mentioned above in connection with the preparation of the adduct. The solids content of the solution is advantageously from about 10 to about 40%, by weight. Procedurally, a preferred method involves slowly adding the acrylic monomer, adduct and catalyst, advantageously as a mixture, to hot solvent. Reaction is continued until the desired endpoint is reached as determined, for example, by determining consumption of the acrylic monomer by chromatographic analysis.

A particularly valuable isocyanato acrylic copolymer employed in the present invention is a copolymer of n-butyl acrylate and an adduct of β-hydroxyethyl methacrylate and 4,4′-methylenebis (cyclohexyl isocyanate). In this case, in Formula I, R is hydrogen, $R_1$ is n-butyl, $R_2$ is methyl, $R_3$ is ethylene and $R_4$ is methylenebis (cyclohexylene).

MIXTURES OF URETHANE PREPOLYMER AND ISOCYANATO ACRYLIC COPOLYMER

The composition of the present invention is prepared simply by mixing the urethane prepolymer and isocyanato acrylic copolymer in the desired proportions. Since each component is prepared in the form of a solution, such solutions will normally be mixed. A curing catalyst, like dibutyl tin dilaurate, may be included, and active hydrogen-containing material, such as a polyol of the type mentioned above in an amount not substantially greater than that stoichiometrically required for reaction with the NCO group present, may be included to promote crosslinking and curing. The solids content of the resulting solution, adjusted where necessary depending upon the intended mode of application by addition of an appropriate solvent (e.g. aromatic hydrocarbon, like benzene, toluene or xylene, or an ester, like ethyl acetate or ethylene glycol monoether acetate) may range from about 1 to about 95%, by weight.

Reference is made herein to the polymeric materials in the composition consisting essentially of a mixture of urethane prepolymer and isocyanato acrylic copolymer. This is not intended to exclude minor amounts of other materials which do not materially alter or detract from the advantageous characteristics of the mixture. For example, a small amount of another polymer, like cellulose acetate butyrate or a silicone, may be included to improve flow and leveling. Of course, fillers and catalysts may also be included for their known purposes.

As stated, the relative proportions of urethane prepolymer and isocyanato acrylic copolymer may range from about 30 to 99% of the former to from 1 to about 70% of the latter, based on the combined weight of both. In the preferred composition the relative proportions are from about 70 to about 95% of the urethane prepolymer to from about 5 to about 30% of the isocyanato acrylic copolymer.

Application of the composition to vinyl or other substrates may be accomplished by spraying, dipping, brushing, roll coating, and so on, followed by drying. The coating cures and crosslinks, as stated, through reaction of the isocyanate groups and moisture in the atmosphere and/or active hydrogen containing materials added just prior to use. Heating may be employed to hasten drying and curing.

The vinyl substrates to which the composition may be applied may be rigid or may be flexible such as plastcized sheet material or fabric-backed vinyl films. The vinyl polymer from which the substrate is prepared is generally polyvinyl chloride, polyvinyl acetate or a copolymer of vinyl chloride and vinyl acetate, of vinyl chloride and vinylidene chloride, of vinyl chloride and acrylonitrile, and the like.

The present invention will be more readily understood from a consideration of the following specific examples which are given for the purpose of illustration only and are not intended to limit the scope of the invention in any way.

EXAMPLE 1

This example illustrates the preparation of a urethane prepolymer.

The following materials are mixed at room temperature:

| | Grams |
|---|---|
| Polypropylene glycol of molecular weight approximately 2000 | 193 |
| Polypropylene glycol of molecular weight approximately 1000 | 98 |
| Polyethertriol of molecular weight approximately 300 which was prepared by the addition polymerization of propylene oxide and trimethylolpropane | 78 |
| Xylene | 225 |
| Trimethyl orthoformate | 3.2 |
| Para-toluene sulfonic acid | 0.5 |

The first three ingredients are in the molar ratio of 1:1:2.66, respectively. To the resulting solution is added 306 grams of 4,4′-methylenebis (cyclohexyl isocyanate). After 20 minutes the mixture is gradually heated to 100° C. over a period of one hour. The isocyanate (—NCO) content of the resulting product is 5.59%.

EXAMPLE 2

This example illustrates the preparation of another urethane prepolymer.

In a stainless steel reactor, equipped with a stirrer, reflux condenser and heating jacket are added, under dry nitrogen, the following materials:

| | Parts by wt. |
|---|---|
| Polypropylene glycol of molecular weight approximately 2000 | 800 |
| 1,3-butanediol | 54 |
| Polyether triol of molecular weight approximately 300 which was prepared by the addition polymerization of propylene oxide and trimethylolpropane | 600 |
| Xylene | 1911 |

The first three ingredients are in the molar ratio of 0.8:1.2:6.0, respectively. After heating the resulting mixture to 79° C., 2096 parts by weight of 4,4′-methylenebis (cyclohexyl isocyanate) are added. The resulting mixture is then heated to 107° C. and held at about that temperature until reaction is complete as determined by analysis of isocyanate content. The product is then cooled to 71° C. and placed in a closed container.

The following Examples 3–12 illustrate the preparation of various isocyanato acrylic copolymers.

EXAMPLE 3

Step 1.—Preparation of 4,4'-methylenebis (cyclohexyl isocyanate) adduct of 2-hydroxyethyl methacrylate Into a one-liter three-necked glass flask equipped with a stirrer, a thermometer, a reflux condenser, an addition funnel and an inlet for nitrogen, the following ingredients were placed:

| | Grams |
|---|---|
| Liquid 4,4'-methylenebis (cyclohexyl isocyanate) (0.50 mol) | 131.0 |
| Toluene (which had previously been dried of any moisture by the use of a molecular sieve) | 456.1 |
| Dinitrobenzene | 0.2 |

This mixture was heated to 75° C. under nitrogen and under vigorous agitation. Then, a mixture of 65.0 grams (0.50 mol) hydroxyethyl methacrylate (containing 200 parts per million hydroquinone as a polymerization inhibitor) and 0.2 gram para-toluene sulfonic acid was added drop-wise at 75° C. over a period of 70 minutes. Cloudiness began to appear in the mixture 40 minutes after the drop-wise addition had been started. Addition of 121.0 grams more toluene (dried) failed to clear the mixture. Heating at 75±2° C. was continued for a total time of 3¾ hours. The mixture was then cooled to room temperature over a half-hour period and filtered through filter paper and a millipore glass filter. The filtrate, a clear slightly yellow liquid, weighed 724.0 grams and had a solids content of 24.5% (equivalent to a yield of 177.3 grams of adduct) and an isocyanate content of 2.84% based on the solution.

Step 2.—Copolymerization of the adduct with n-butyl acrylate

Into a one-liter four-necked glass reactor (equipped analogously to the apparatus in step 1) was placed 382.0 grams ethylene glycol monoethyl ether acetate. This was heated to 125°±2° C. and maintained under nitrogen and vigorous agitation. Azobisisobutyronitrile, 2.55 grams, was dissolved in a mixture of 361.0 grams of the filtered adduct solution resulting from step 1 (equivalent to 0.22 mol of adduct) and 163.1 grams (1.27 mol) n-butyl acrylate containing 5 parts per million monomethyl ether of hydroquinone (inhibitor). This mixture was added to the ethylene glycol monoethyl ether acetate at 125° C. at a moderate rate over a 50 minute period. The reaction mixture was held at 125° C. for an additional 30 minutes. The mixture was cooled rapidly to 90° C., 0.1 gram additional azobisisobutyronitrile was added, and polymerization was allowed to proceed over 1¼ hours while the reaction flask was cooled slowly to room temperature. The resulting solution was clear, slightly yellow. The following values were determined:

| | |
|---|---|
| Solids contents, percent | 25.1 |
| Isocyanate (NCO) content, percent based on solids | 4.74 |
| Viscosity, centipoise | 13.0 |
| Conversion, percent (determined by gas chromatography) | 92 |

In this copolymer the molar proportions of n-butyl acrylate and adduct are 85% and 15%, respectively.

EXAMPLE 4

The procedure of Example 3 is followed except that in step 2 the molar proportions of n-butyl acrylate and adduct used are 99% and 1%, respectively.

EXAMPLE 5

The procedure of Example 3 is followed except that in step 2 the molar proportions of n-butyl acrylate and adduct used are 90% and 10%, respectively.

The following table illustrates the relative influence on certain physical properties of varying molar proportions of adduct (prepared according to step 1 of Example 3) and n-butylacrylate in copolymers of the two. The left hand column designates the mol percent of n-butylacrylate in the copolymer, the balance being adduct.

| | Tackiness | Hardness | Tensile | Elongation |
|---|---|---|---|---|
| 100 | Very tacky | Very soft | Very low | Very high. |
| 99 | Tacky | Soft | Low | High. |
| 95 | Slightly tacky | Mod. hard | Medium | Medium. |
| 90 | None | Hard | High | Low. |
| 85 | do | Very hard | Very high | Very low. |

The copolymer with 90 mol percent n-butyl acrylate (10 mol percent adduct) was air cured and subjected to UV radiation. Results showed no yellowing after 300 hours of accelerated exposure with 90–95% gloss retention. At 15 mol percent adduct (85 mol percent n-butyl acrylate) air cure films have a pencil hardness of 3H, excellent gloss and good solvent resistance to acetone. The copolymer showed good adhesion and film characteristics when applied to wood, metal and vinyl substrates.

EXAMPLES 6–12

The procedure of Example 3 is followed except that, in preparing the copolymer in step 2, the following molar proportions (percent) of designated materials are used:

TABLE I

| Examples | 6 | 7 | 8 | 9 | 10 | 11 | 12 |
|---|---|---|---|---|---|---|---|
| Butyl acrylate | 80 | 75 | 70 | 75 | | | |
| Ethyl acrylate | | | | | 85 | 80 | 75 |
| Methyl methacrylate | | 5 | | | | | |
| Ethylthioethyl methacrylate | 5 | 5 | 5 | | | 5 | 5 |
| Stearyl methacrylate | | | | 10 | | | |
| Acrylonitrile | | | | 10 | | | 5 |
| Adduct | 15 | 15 | 15 | 15 | 15 | 15 | 15 |
| Percent solids | 35.1 | 32.6 | 26.7 | 28.2 | 33.9 | 31.9 | 32.5 |
| Percent NCO (based on solids) | 4.0 | 3.9 | 5.2 | 3.7 | 4.8 | 5.7 | 4.7 |

EXAMPLES 13–28

These examples illustrate the preparation of mixtures of urethane prepolymer and isocyanato acrylic copolymers in which the designated copolymers are mixed in the proportions set forth in Table II and the mixture is adjusted to a solids content of 50% with methyl ethyl ketone. Certain properties for each composition are also set forth in Table II. In Examples 13–20 the urethane prepolymer was that prepared in Example 1 and in Examples 21–28 the urethane prepolymer was that prepared in Example 2.

The foregoing compositions were applied to sheets of uncoated, black polyvinylchloride using a hand spray gun. The samples, after coating, were allowed to dry 15 minutes under ambient conditions and then were baked for 20 minutes in an oven at 275° F. and allowed to further cure at 73° F. and 50% relative humidity for three days.

Adherence of each coating to the vinyl material was tested by cutting through the coating with a razor blade twice, at right angles in an X-shaped pattern, then pressing over the X a pressure-sensitive flatback paper tape, (Scotch brand masking tape number 250, from Minnesota Mining and Manufacturing Company of St. Paul, Minn.), and finally pulling the pressure-sensitive tape off. If the adhesion between the coating and the vinyl substrate is poor, less than the adhesion between the pressure-sensitive tape and the coating, the coating will adhere to the tape and will separate from the vinyl substrate when the tape is pulled off. However, if the adhesion between the coating and the vinyl substrate is greater than the adhesion between the tape and the coating, the coating will remain firmly attached to the vinyl material and will not peel off with the tape.

When this test was applied to the coatings containing the isocyanato acrylic copolymer, the coatings were found to adhere firmly to the vinyl substrate. The urethane coating which contained no isocyanato acrylic copolymer had poor adhesion to the vinyl, as it readily peeled from the vinyl surface.

To determine whether adherence of the coatings to the vinyl would decrease during storage or use to the effects of a possible slow migration of plasticizer from the vinyl to the coating-vinyl interface, a part of each vinyl test piece which had been coated with the mixture was placed in an oven maintained at 130° F. and was removed periodically and allowed to cool to room temperature before application of the tape adhesion test. Other parts of each vinyl test piece were maintained in storage at room temperature. Tests showed the coatings from the mixtures containing the isocyanato acrylic copolymers had good adherence to the vinyl after storage periods of one week, two weeks, one month and three months at each of the two temperature conditions.

To 50 g. portions of each of the compositions of Examples 26, 27 and 28 were added 0.57 g. dibutyl tin dilaurate, 5.3 g. methyl isobutyl ketone, 1.6 g. ethylene glycol monoethyl ether acetate, 9.8 g. toluene and 9.8 g. xylene. These mixtures were then poured on separate pieces of a black calendered compounded polyvinylchloride sheet, approximately 0.01 inch thick. A solution of the polyurethane prepolymer, in the absence of any of the polymer of this example, was poured on another piece of the same sheet. These sheets were manipulated to cause the mixtures to contact all of the upper surfaces evenly and then were allowed to stand under ambient conditions until the solvents evaporated. The sheets were then baked for five minutes at 240° F. in an oven and allowed to cool to room temperature. Adhesion of the coating to the sheet was found to be good on each of the three sheets coated with mixtures containing the various amounts of the copolymer, but no adhesion was present on the sheet coated with the polyurethane prepolymer alone. The sheets were then placed in an oven maintained at 125° F. Tests showed good adherence of each of the coatings containing the copolymer after 6, 13, 29 and 64 days of storage at 125° F.

EXAMPLE 29

Step 1.—Preparation of 4,4' - methylenebis(cyclohexyl isocyanate) adduct of 2 - hydroxyethyl methacrylate Into a four-necked 500 milliliter round bottom glass flask equipped with a reflux condenser, a nitrogen inlet and outlet, a thermometer, stirrer, and dropping funnel, the following ingredients were placed:

| | Grams |
|---|---|
| Liquid 4,4'-methylenebis(cyclohexyl isocyanate) (1.00 mol) | 262.0 |
| Ethyl acetate | 394.2 |
| Dinitrobenzene | 2.0 |
| Trimethylorthoformate | 0.15 |
| Para-toluene sulfonic acid | 0.10 |

The mixture was heated to 75° C. under nitrogen and agitation and maintained at this temperature. From the dropping funnel was added, dropwise, over a period of 2.25 hours, a mixture of:

| | Grams |
|---|---|
| Hydroxyethyl methacrylate (96% purity), (1.00 mol) | 130.0 |
| Trimethylorthoformate | 0.15 |
| Para-toluene sulfonic acid | 0.10 |

The resulting mixture was maintained one hour at 75° C. after addition of these ingredients had been completed. It was then cooled to 30° C. The mixture was a practically clear, slightly yellow, liquid which was determined to have a solids content of 47.2 percent by weight and an isocyanate (NCO) content of 13.4% by weight, based on solids.

Step 2.—Polymerization of the adduct with ethyl methacrylate and n-butyl acrylate Into a 500 milliliter glass reactor equipped with stirring apparatus, thermometer, nitrogen inlet and outlet, dropping funnel, and desiccator tubes was charged 354.4 grams toluene which had previously been dried with para-toluene sulfonic acid and trimethylorthoformate. This was heated to 100° C.±2° C. and held at this temperature. From the dropping funnel was added a mixture composed of the following:

64.0 grams n-butyl acrylate, containing 5 parts per million monomethyl ether of hydroquinone (inhibitor),
40.0 grams ethyl methacrylate, containing 25 parts per million monomethyl ether of hydroquinone (inhibitor),
124.0 grams of the 47.2% solution of the adduct from step 1.
1.6 grams azobisisobutylronitrile Addition of this mixture was carried out slowly over a period of 3.42 hours, during which time the temperature of the reaction mixture rose slowly to 105–110° C. and was maintained constant within this range. The mixture was cooled to room temperature and allowed to stand overnight, sealed under nitrogen. In the morning, 0.1 gram additional azobisisobutylronitrile was added and the mixture was heated at 90±2° C. for one hour. The resulting mixture was a clear, slightly yellow, liquid which was determined to have a solids content of 31.2 percent by weight, an isocyanate (NCO) content of 4.34 percent by weight based on the solids present, and a viscosity of 42 centipoise at 25° C.

Use of the copolymer in mixture with
a polyurethane prepolymer

A mixture was prepared of the following:

6.6 grams of the above 31.2% copolymer solution,
37.2 grams of a polyurethane prepolymer solution of Example 2 (with additional xylene to dilute the solution to 54.6% by weight solids content).
7.2 grams xylene
0.45 gram dibutyltin dilaurate,
3.9 grams anhydrous methyl isobutyl ketone
1.2 grams ethylene glycol monoethyl ether acetate
7.2 grams toluene.

The mixture contains the isocyanato acrylic copolymer in the proportion of one part by weight to ten parts by weight of the polyurethane prepolymer.

The mixture was applied, by spraying, to a black calendered compounded polyvinylchloride sheet, approximately 0.01 inch thick. The composition showed good adhesion according to the tape test described in Examples 13–28 whereas the same polyurethane prepolymer without the isocyanato acrylic copolymer did not adhere.

EXAMPLES 30–35

These examples illustrate the preparation of further isocyanato acrylic copolymers. The procedure of Example 3 is followed except that, in preparing the copolymers in step 2, the following molar proportions (percent of designated materials are used:

TABLE III

| Example | 30 | 31 | 32 | 33 | 34 | 35 |
|---|---|---|---|---|---|---|
| Methyl methacrylate | | | | 75 | 70 | 65 | 65 |
| Ethyl methacrylate | | 35 | | | | |
| Ethyl acrylate | | | 17 | 17 | 17 | 17 |
| Butyl acrylate | 80 | 50 | | | | |
| 2-ethylhexyl methacrylate | | | | | 10 | |
| Isodecyl methacrylate | | | | | | 10 |
| Ethylthioethyl methacrylate | | | | 5 | | |
| Glycidyl methacrylate | 5 | | | | | |
| Adduct | 15 | 15 | 8 | 8 | 8 | 8 |
| Percent solids | 27.4 | 31.2 | 29.8 | 26.5 | 40.3 | 25.5 |
| Percent NCO (based on solids) | 4.0 | 4.3 | 2.7 | 3.0 | 2.6 | 2.7 |

EXAMPLE 36

This example illustrates another procedure for preparing the preferred isocyanato acrylic copolymer, the parts given being by weight.

Step 1.—Preparation of 4,4'-methylenebis (cyclohexyl isocyanate) adduct of 2-hydroxyethyl methacrylate One hundred thirty parts of 2-hydroxyethyl methacrylate (93–96%), 394.2 parts of ethyl acetate and 2 parts of m-dinitrobenzene were added to a reactor and the mixture was heated to 60° C. Then 262 parts of liquid 4,4'-methylenebis (cyclohexyl isocyanate) were added causing the temperature to drop to 50° C. As soon as the mixture was homogenous, 0.2 part of stannous octoate was added. Following a slight temperature rise, the mixture was heated to 70° C. and maintained at about this temperature for about 1.5 hours until the NCO content had fallen to about 11.40%, by weight, based on solids. The product had a solids content of about 50%.

Step 2.—Copolymerization of the adduct with n-butyl acrylate

Toluene (290.9 parts) was charged to a reactor and heated to 100° C. In a separate vessel were mixed 108.8 parts of n-butylacrylate, 117.6 parts adduct solution from step 1 (solution weight of 50% solution) and 1.7 parts of azobisisobutyronitrile until the latter is completely dissolved. The mixture was then slowly added to the hot toluene in the reactor over a period of about 4.5 hours. During this addition the temperature rose to about 110° C. and after the addition mixing was continued at about 110° C. for an additional half hour. Then were rapidly added 2 additional parts of azobisisobutyronitrile. After another half hour at about 110° C., the material was cooled to room temperature.

The resulting product had a solids content of about 32.5% and an NCO content of 3.96%, by weight, based on solids.

EXAMPLE 37

Step 1.—Preparation of 4,4'-methylenebis (cyclohexyl isocyanate) adduct of 2-hydroxymethyl methacrylate Ingredients used:                                         Grams Hydroxyethyl methacrylate (2.17 moles) _____ 282.6
Liquid 4,4'-methylene-bis(cyclohexyl isocyanate) (2.17 moles) _____ 570.0
Ethyl acetate _____ 852.0
Meta-dinitrobenzene _____ 4.2
Trimethylorthoformate _____ 0.4
Para-toluene sulfonic acid _____ 0.6

The ethyl acetate plus an excess was charged into a 3 liter 3 neck round bottom flask equipped with a stirrer, nitrogen inlet, thermometer, reflux condenser with drying tube and Dean-Stark type distilling trap. This was distilled for 0.5 hour at 78° C. and the distillate, consisting of azeotroped water and etheyl acetate excess, was discarded. To the ethyl acetate now anhydrous, remaining in the reaction flask, at 60° C. was added the dinitrobenzene, trimethylorthoformate, and toluene sulfonic acid, and the diisocyanate. The hydroxyethyl methacrylate was then added dropwise from a dropping funnel over a period of 7 hours at 73–74° C. The mixture was held an additional 2 hours at 74° C. before cooling to room temperature.

The total solids content was determined to be 50.1 percent by weight and the isocyanate (NCO) content based on non-volatile material was determined to be 11.8%.

Step 2.—Copolymerization of the adduct with butyl acrylate

Ingredients used:
1596.0 grams toluene
652.8 grams butyl acrylate
702.0 grams of the 50.1% solution of the adduct from step 1.
10.2 grams azobisisobutyronitrile The toluene, plus an excess of 100 milliliters, was charged to a 5 liter 3-necked flask equipped the same as the flask used for the preparation of the adduct. This was distilled at 112° C. for two hours and 100 milliliters of distillate (corresponding to the excess toluene charged), containing azeotroped water, was discarded. The flask was cooled to 105° C. and the other ingredients, mixed, were added dropwise over a period of six hours. The reaction mixture was heated at 105° C. one additional hour after the addition of the mixture had been completed. The total solids content of the resulting polymer solution was determined to be 33.3 percent by weight and the isocyanate (NCO) content, based on non-volatiles, was 3.99%.

Use of the polymer in mixture with a polyurethane prepolymer

The polyurethane prepolymer used in this example had been prepared by the reaction of 2.0 moles of polypropylene glycol of molecular weight 1000, 1.25 moles of 1,3-butylene glycol, 2.0 moles of trimethylolpropane, and 10.0 moles of an 80/20 mixture of 2,4- and 2,6-toluene diisocyanates at 175° F. in a stainless steel reactor at 53 percent (by weight) solids content in a solvent mixture composed of 6.5 percent (by weight) of propylene carbonate and 93.5 percent (by weight) of xylene. Dimethyl dodecyl amine, 0.1% by weight based on the non-volatile materials, was used as a catalyst in this preparation.

To 100 grams of this polyurethane prepolymer solution was added 15.9 grams of the 33.3% solution of the copolymer from the preceding section. This is equivalent to a ratio of one part by weight of the copolymer to ten parts by weight of the urethane prepolymer on a solvent-free basis.

This mixture was poured on to five vinylchloride polymer or copolymer sheet materials received from five different manufacturers:

(1) A white composition intended for use on automobile convertible tops,
(2) A black calendered sheet, about 5 to 7 mils in thickness,
(3) A tan fabric-backed composition which is probably made from a polyvinyl chloride plastisol formulation,
(4) A black pigmented vinyl polymer composition which is used for shoe uppers,
(5) A white fabric-backed composition which is probably made from a polyvinyl chloride plastisol formulation.

The sheets were manipulated to cause the mixture to contact all of their upper surfaces evenly and then were allowed to stand for ten minutes under ambient conditions while the solvents evaporated. The sheets were then baked for three minutes in an oven at 275° F., after which they were allowed to stand one day at room temperature. At this time, the adherence of the coatings to each of the polyvinyl chloride polymer or copolymer sheets was tested by use of X-cuts and pressure-sensitive flatback masking tape (technique described in Examples 13–28). Adherence to each sheet was found to be good. The sheets were then placed in an oven maintained at 125° F. Tests showed good adherence to each of the sheets was present after three days, one week, and one month of storage at 125° F.

EXAMPLE 38

Copolymerization of adduct with 2-ethylhexyl acrylate

Ingredients used:

203.2 grams of the 50 percent solution of the adduct of Step 1, Example 36 (this is equivalent to 0.259 mol of adduct).
187.9 grams (1.02 mols) 2-ethylhexyl acrylate
502.5 grams toluene
2.9 grams azobisisobutyronitrile
3.5 grams 10 percent, by weight, solution of azobisisobutyronitrile in toluene This copolymer has an 80/20 mol ratio of 2-ethylhexyl acrylate to 2-hydroxyethyl methacrylate-4,4'-methylene-bis-(cyclohexyl isocyanate) adduct.

The toluene was placed in a one liter glass reaction vessel and was heated to 100° C. The other ingredients, with the exception of the 10 percent solution of azobisisobutyronitrile, were mixed until the azobisisobutyronitrile was dissolved and then were added dropwise to the reaction vessel over a period of 4.75 hours. Heating was continued for an additional hour; the 10 percent solution of azobisisobutyronitrile was added in the middle of this hour. The mixture was then cooled to less than 30° C. The solution had a solids content of 30.33 percent by weight, an isocyanate (NCO) content of 1.34 percent (or 4.2 percent based on the solids), and a viscosity of 10 centipoise.

Use of the copolymer in mixtures with a polyurethane prepolymer

The polyurethane prepolymer was that described in Example 37.

Three mixtures were prepared from the polyurethane prepolymer, the above adduct copolymer, a 10 percent by weight solution of dibutyl tin dilaurate in toluene, and xylene. The mixtures were prepared to contain 35 percent by weight solids. The compositions of the three mixtures were as follows:

| | A | B | C |
|---|---|---|---|
| Polyurethane prepolymer solution, 53% by weight solids, grams | 100 | 100 | 100 |
| Adduct copolymer solution, 30.33% by weight solids, grams | | 17.5 | 175 |
| 10% solution of dibutyl tin dilaurate in toluene, grams | 1 | 1 | 2 |
| Xylene, grams | 50 | 48.5 | 25 |
| Solids content, percent by weight | 35 | 35 | 35 |

Calculated values, for the composition of the non-volatile portion of these mixtures, as percentages by weight, are as follows:

| | A | B | C |
|---|---|---|---|
| Polyurethane | 99.8 | 90.7 | 49.9 |
| Adduct copolymer | | 9.1 | 49.9 |
| Dibutyl tin dilaurate | 0.2 | 0.2 | 0.2 |

The weight ratio of adduct copolymer to polyurethane present, on a solvent-free basis, is 1:10 in B and 1:1 in C.

These mixtures were each poured on separate pieces of a black calendered compounded polyvinyl chloride sheet which are approximately 0.005 inch thick, and the pieces were manipulated to cause the mixtures to contact all of the upper surfaces evenly. The coated sheets were allowed to stand two hours at room temperature, were baked three minutes at 275° F. and then were allowed to stand 24 hours at room temperature.

Adhesion tests after standing 24 hours, made by the X-cut and masking tape technique previously described, showed poor adhesion on sheets A and B, and good adhesion on sheet C. Adhesion on sheet A was poorer than on sheet B. Sheet C had a surface which was slightly sticky.

The sheets were each cut into two parts. One part was placed in an over maintained at 130° F.; the other part was maintained under room conditions. After one week, these specimens were tested for adhesion using the X-cut and masking tape technique and showed the following:

| | One week at— | |
|---|---|---|
| | 130° F. | R.T. |
| A | Poor | Poor. |
| B | Good | Good. |
| C | do | Do. |

EXAMPLE 39

The urethane prepolymer of Example 2, diluted to 35% solids with a solvent mixture consisting of 37%, by weight, of xylene, 37% toluene, 20% methyl isobutyl ketone and 6% ethylene glycol monomethyl ether acetate; the copolymer of Example 36 (29.8% solids); and a catalyst solution composed of 5.77 parts, by weight of N,N,N',N'-tetrakis (2-hydroxypropyl)-ethylenediamine, 9.23 parts of organotin urethane curing catalyst, 1.92 parts of xylene and 83.08 parts of toluene, were mixed in the following proportions (parts by weight):

|  | D | E | F | G |
|---|---|---|---|---|
| Copolymer solution | | 11.7 | 35 | 128 |
| Prepolymer solution | 100 | 100 | 100 | 100 |
| Catalyst solution | 3 | 3 | 3 | 6 |

The calculated composition of the non-volatile portions of the mixtures, in percent by weight, were as follows:

|  | D | E | F | G |
|---|---|---|---|---|
| Copolymer | | 8.96 | 22.73 | 51.51 |
| Prepolymer | 98.73 | 89.88 | 76.29 | 47.27 |
| Catalyst | 1.27 | 1.16 | 0.98 | 1.22 |

The mixtures were applied to pieces of black calendered compounded polyvinylchloride sheet approximately 0.005" thick, handled and cured as in Example 38. Adhesion tests after standing 24 hours showed poor adhesion for sheet D and good adhesion for sheets E, F and G. Test specimens stored for 1 and 2 weeks at 130° F. and at room temperature showed the following adhesion results when tested as in Example 38.

|  | 130° F. | | R.T. | |
|---|---|---|---|---|
|  | One week | Two weeks | One week | Two weeks |
| D | Poor | Poor | Poor | Poor. |
| E | Good | Good | Good | Good. |
| F | do | do | do | Do. |
| G | do | do | do | Do. |

EXAMPLE 40

To a urethane prepolymer prepared from polypropylene glycol (average M.W. about 1000), a mixture of polyether triols of average M.W. ranging from about 300 to about 4000 prepared by the addition polymerization of propylene oxide and trimethylolpropane, and 2,4- and 2,6-toluene diisoycanate (NCO/OH ratio of 1.6) is added an isocyanato acrylic copolymer as prepared in Example 36. The solids ratio of copolymer to prepolymer is about 0.3:1. The combined copolymer and prepolymer solids have a concentration of about 30%, by weight, in a solvent mixture of ethyl acetate, toluene and xylene.

The composition is applied by dipping to strips (1 x 3 x 0.08") of SBR rubber (styrene-butadiene) which have been preheated at 450° F. for 2 minutes and cooled for 3 minutes. The coated strips are allowed to stand for 15 minutes at room temperature to evaporate the solvents. The strips are then cured by heating at 450° F. for 2 minutes and then stored at room temperature overnight. The strips are then reheated at 450° F. for different periods of time ranging from 1 to 10 minutes, and cooled. The coatings are then subjected to rubbing with a cloth wet with naphtha. None of the coating is removed from any of the strips showing lack of degradation.

However, when the urethane prepolymer alone is applied to the same stock and tested in the same manner, the coating is removed from the test specimens which are heated at 450° F. for 6 minutes and longer, showing degradation of the coating at that stage.

What is claimed is:

1. A solution of polymeric material consisting essentially of a mixture of (A) an isocyanate containing urethane prepolymer prepared by reacting an organo diisocyanate and a polyol or mixture of polyols having an average molecular weight from about 300 to about 3000 in the ratio to provide more than one to about 4 isocyanate groups per hydroxy group on the polyol and (B) a copolymer of an acrylic monomer and an adduct of an organo diisocyanate and a hydroxyl alkyl acrylic monomer which copolymer has the formula

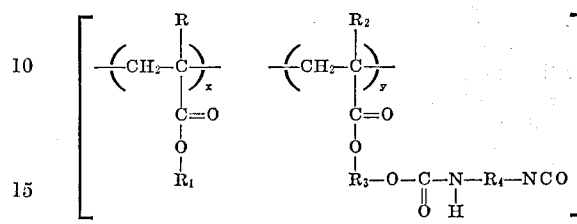

where R is hydrogen or methyl; where $R_1$ is an alkyl group containing from 1 to 10 carbon atoms; where $R_2$ is hydrogen or methyl; where $R_3$ is an alkylene chain containing from 2 to 4 carbon atoms the total number of carbon atoms, in $R_2$ plus $R_3$ being at least 3; where $R_4$ is a divalent organo radical; where $x$ is from about 0.70 to 0.99; where $y$ is from 0.01 to about 0.30; and where the relative proportions of A and B are from about 30 to about 99% of A to from about 1 to about 70% of B, by weight, based on the combined weight of both.

2. The composition of claim 1 wherein $y$ is from about 0.05 to about 0.20 and $x$ is from about 0.95 to about 0.80.

3. The composition of claim 1 wherein $y$ is about 0.15 and $x$ is about 0.85.

4. The composition of claim 1 wherein the relative proportions of A and B are from about 70 to about 95% of A to from about 30 to about 5% of B based on the combined weight of both.

5. The composition of claim 1 wherein R is hydrogen and $R_1$ is n-butyl.

6. The composition of claim 1 wherein $R_2$ is methyl and $R_3$ is ethylene.

7. The composition of claim 1 wherein R is hydrogen, $R_1$ is n-butyl, $R_2$ is methyl and $R_3$ is ethylene.

8. The composition of claim 1 wherein $R_4$ is methylenebis (cyclohexylene).

9. The composition of claim 5 wherein $R_4$ is methylenebis (cyclohexylene).

10. The composition of claim 6 wherein $R_4$ is methylenebis (cyclohexylene).

11. The composition of claim 7 wherein $R_4$ is methylenebis (cyclohexylene).

12. The composition of claim 2 wherein R is hydrogen and $R_1$ is n-butyl.

13. The composition of claim 2 wherein $R_2$ is methyl an $R_3$ is ethylene.

14. The composition of claim 2 wherein R is hydrogen, $R_1$ is n-butyl, $R_2$ is methyl and $R_3$ is ethylene.

15. The composition of claim 2 wherein $R_4$ is methylenebis (cyclohexylene).

16. The composition of claim 12 wherein $R_4$ is methylenebis (cyclohexylene).

17. The composition of claim 13 wherein $R_4$ is methylenebis (cyclohexylene).

18. The composition of claim 14 wherein $R_4$ is methylenebis (cyclohexylene).

19. The composition of claim 3 wherein R is hydrogen and $R_1$ is n-butyl.

20. The composition of claim 3 wherein $R_2$ is methyl and $R_3$ is ethylene.

21. The composition of claim 3 wherein R is hydrogen, $R_1$ is n-butyl, $R_2$ is methyl and $R_3$ is ethylene.

22. The composition of claim 3 wherein $R_4$ is methylenebis (cyclohexylene).

23. The composition of claim 19 wherein $R_4$ is methylenebis (cyclohexylene).

24. The composition of claim 20 wherein $R_4$ is methylenebis (cyclohexylene).

25. The composition of claim 21 wherein $R_4$ is methylenebis (cyclohexylene).

26. The composition of claim 4 wherein R is hydrogen and $R_1$ is n-butyl.

27. The composition of claim 4 wherein $R_2$ is methyl and $R_4$ is ethylene.

28. The composition of claim 4 wherein R is hydrogen, $R_1$ is n-butyl, $R_2$ is methyl and $R_3$ is ethylene.

29. The composition of claim 4 wherein $R_4$ is methylenebis (cyclohexylene).

30. The composition of claim 26 wherein $R_4$ is methylenebis (cyclohexylene).

31. The composition of claim 27 wherein $R_4$ is methylenebis (cyclohexylene).

32. The composition of claim 28 wherein $R_4$ is methylenebis (cyclohexylene).

33. The composition of claim 4 wherein $y$ is from about 0.05 to about 0.20 and $x$ is from about 0.95 to about 0.80.

34. The composition of claim 4 wherein $y$ is about 0.15 and $x$ is about 0.85.

35. The composition of claim 33 wherein R is hydrogen and $R_1$ is n-butyl.

36. The composition of claim 33 wherein $R_2$ is methyl and $R_3$ is ethylene.

37. The composition of claim 33 wherein R is hydrogen, $R_1$ is n-butyl, $R_2$ is methyl and $R_3$ is ethylene.

38. The composition of claim 33 wherein $R_4$ is methylenebis (cyclohexylene).

39. The composition of claim 37 wherein $R_4$ is methylenebis(cyclohexylene).

40. The composition of claim 34 wherein R is hydrogen, $R_1$ is n-butyl, $R_2$ is methyl, $R_3$ is ethylene and $R_4$ is methylenebis (cyclohexylene).

41. The method which comprises applying to a vinyl substrate the composition of claim 1 and drying.

42. The method of claim 41 wherein the composition is that of claim 2.

43. The method of claim 41 wherein the composition is that of claim 3.

44. The method of claim 41 wherein the composition is that of claim 4.

45. The method of claim 41 wherein the composition is that of claim 5.

46. The method of claim 41 wherein the composition is that of claim 6.

47. The method of claim 41 wherein the composition is that of claim 7.

48. The method of claim 41 wherein the composition is that of claim 8.

49. The method of claim 41 wherein the composition is that of claim 11.

References Cited

UNITED STATES PATENTS

| | | | |
|---|---|---|---|
| 3,028,367 | 4/1962 | O'Brien | 260—859 |
| 3,304,273 | 2/1967 | Stamberger | 260—859 |
| 3,368,988 | 2/1968 | Sekmakas | 260—859 |
| 3,382,297 | 5/1968 | Thompson | 260—859 |
| 3,457,324 | 7/1969 | Sekmakas | 260—859 |
| 3,509,234 | 4/1970 | Burlant | 260—859 |
| 3,522,218 | 7/1970 | Pedain | 260—859 |
| 3,523,093 | 8/1970 | Stamberger | 260—859 |
| 3,549,583 | 12/1970 | Nagata | 260—859 |

PAUL LIEBERMAN, Primary Examiner

U.S. Cl. X.R.

117—138.8 R, A, UA; 260—16, 17 R, 22 CB, 22 TN, 31.4 R, 32.8 N, 33.2 R, 33.4 UR, 33.6 UA, 33.6 UB, 75 TN, 77.5 A, 77.5 AM, 77.5 AP, 77.5 CR, 824, 827, 836